UNITED STATES PATENT OFFICE.

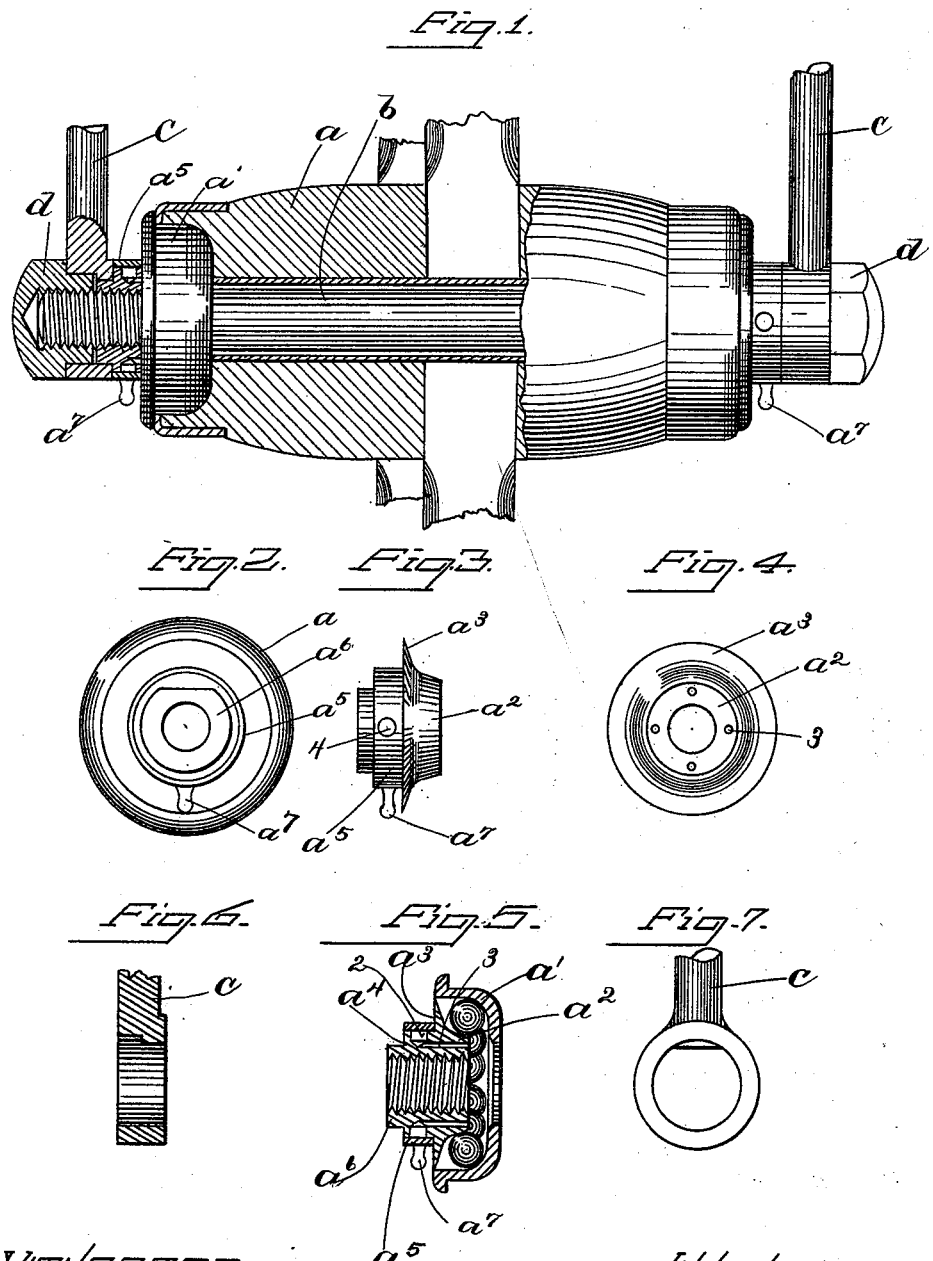

STERLING ELLIOTT, OF NEWTON, ASSIGNOR TO THE HICKORY WHEEL COMPANY, OF SOUTH FRAMINGHAM, MASSACHUSETTS.

BALL-BEARING.

SPECIFICATION forming part of Letters Patent No. 518,139, dated April 10, 1894.

Application filed February 18, 1893. Serial No. 462,804. (No model.)

*To all whom it may concern:*

Be it known that I, STERLING ELLIOTT, of Newton, county of Middlesex, State of Massachusetts, have invented an Improvement in Ball-Bearings, of which the following description, in connection with the accompanying drawings, is a specification, like letters and figures on the drawings representing like parts.

Ball bearings for wheels have usually been composed essentially of two parts, such for instance as a ball-receiving cup which is secured to the wheel, and a ball-retaining plate which is secured to the axle. The ball-retaining plate is usually adjustably secured to the axle, and is made of a sufficient diameter to fit within and substantially close the entrance to the ball-receiving cup, yet in order that the wheel may turn freely, frictional engagement between said parts should not be permitted, and the small opening which is presented to prevent such frictional engagement offers an entrance for dust and grit. In using wheels provided with such ball bearings it has been found that the mud lodges upon the perimeter of the ball-retaining plate, which being on a level with the said opening gradually works itself into the ball-receiving recess.

One of the objects of this invention is to so construct the ball-retaining plate that this objection may be overcome, and at the same time provide one or more oil passages so arranged that the oil may be delivered into the recess just back of the balls. The entrances to said oil passages may be made quite large, so as to receive a spanner by means of which the ball-retaining plate may be adjusted, and in such event I have provided means for closing said entrances.

Figure 1, shows in front elevation and partial section a hub of a wheel provided with ball bearings embodying this invention; Fig. 2, an end view of the ball-retaining plate and cup; Fig. 3, a side view of the ball-retaining plate; Fig. 4, a right hand side view of the ball-retaining plate shown in Fig. 3; Fig. 5, a vertical section of the ball bearing, and Figs. 6 and 7, details of the lower ends of the wheel supporting arms.

The hub $a$ which may be of wood or any other material, and the axle $b$, are or may be of any usual or suitable construction. The hub $a$ is provided at the ends with ball-receiving cups $a'$, and ball-retaining plates screwed onto the axle, entering said cups, and retaining the balls in place as well as affording in conjunction with the cups suitable bearings therefor.

The ball-retaining plate comprises essentially a bearing portion $a^2$, for the balls, a radial flange $a^3$, of a diameter to substantially fit and thereby close the entrance to the ball-receiving cup, and an outer or exposed projecting portion $a^4$, of a lesser diameter than the flange. When the ball-retaining plate is suitably adjusted as shown in Fig. 5, it will be noticed that the outer or exposed face of the flange $a^3$, is substantially flush with the end of the ball-receiving cup, and any mud which may lodge upon the perimeter of the projection $a^4$ cannot find its way into the ball-receiving recess, thereby accomplishing one of the objects of the invention. The thickness of the flange $a^3$ gradually diminishes toward the outer edge, until at such point a knife edge is produced, as best shown in Fig. 5, and when so constructed it will be obvious that no grit can be deposited or remain between the edge of the flange and the cup; and furthermore the ball-retaining plate when provided with such a flange, may be made to more accurately fit the opening in the ball-receiving cup.

The projection $a^4$, is provided with holes 2 to receive a spanner by means of which the ball-retaining plate may be adjusted, and also with oil passages 3, extending in a horizontal direction from said holes 2, inwardly to the inner end of the plate, so that any oil which may be placed in said holes 2 will enter the ball receiving recess at a point back of the balls. A ring $a^5$, encircles the projection $a^4$, binding frictionally thereon, and effectually closing the holes 2, said ring being provided with a hole 4, which may be brought into position to register with any one of the holes 2, when it is desired to supply oil or to insert the spanner. The ring $a^5$ is provided with a finger piece $a^7$ by which it may be turned. The ring $a^5$ is made of a width corresponding to the length of the projection $a^4$ so that it bears loosely against the flange $a^5$ upon one side, and against the arm c upon the other side, yet any other suitable means may be provided for holding said ring in position.

As a simple and efficient means of restraining the ball-retaining plate from rotation, I have formed upon the outer end of the projection $a^4$, a circular projection $a^6$, slabbed off upon its upper side, and the lower end of the wheel supporting arm c, is provided with a recess corresponding with the shape of said projection $a^6$, and when the arm c is placed upon the axle b, abutting against the projection $a^4$ or not as desired, the projection $a^6$ will enter the recess therein, and the plate thereby positively held against rotation. The arms c are held in place upon the axle by shouldered nuts d or otherwise.

It is obvious that the projection $a^6$ may be shaped differently than that herein shown, yet the essential point is that it shall be other than round, and the recess in the lower part of the arm c shaped to receive it.

I claim—

1. A ball bearing for wheels comprising a ball-receiving cup, and ball-retaining plate having oil passages terminating back of the balls, substantially as described.

2. A ball bearing for wheels comprising a ball receiving cup, and ball-retaining plate, having holes 2, and holes 3, leading from said holes 2, and terminating at a point back of the balls, substantially as described.

3. A ball bearing for wheels comprising a ball receiving cup, and ball-retaining plate, having oil passages therethrough, and a ring encircling a portion of the plate to close the entrances to said oil passages, and having a hole through it which may be made to register with the entrances to said oil passages, substantially as described.

4. A ball bearing for wheels comprising a ball receiving cup, and ball-retaining plate having oil passages therethrough, and a ring encircling a portion of the plate to close the entrances to said oil passages, and having a hole through it which may be made to register with the entrances to said oil passages, and a finger piece $a^5$, projecting from said ring, substantially as described.

5. A ball bearing for wheels comprising a ball receiving cup, and ball retaining plate having a flange substantially flush with the end of the cup, and a projection of lesser diameter than the flange provided with holes, a ring encircling said projection corresponding in width to the length thereof, and having a hole and a finger piece, substantially as described.

6. A ball bearing for wheels comprising a ball-receiving cup, and a ball-retaining plate having a bearing portion for the balls, and the flange $a^3$, contained within and substantially closing the opening into said ball-receiving cup, the outer edge of which is diminished in thickness to a knife edge, substantially as described.

In testimony whereof I have signed my name to this specification in the presence of two subscribing witnesses.

STERLING ELLIOTT.

Witnesses:
BERNICE J. NOYES,
CHARLES B. CROCKER.